(12) United States Patent
Baldwin

(10) Patent No.: US 10,823,752 B2
(45) Date of Patent: Nov. 3, 2020

(54) METHOD FOR DETERMINING AIRPLANE FLIGHT-PATH ANGLE WITH THE USE OF AIRSPEED AND THE GLOBAL POSITIONING SYSTEM (GPS)

(71) Applicant: A. Wayne Baldwin, Lander, WY (US)

(72) Inventor: A. Wayne Baldwin, Lander, WY (US)

( * ) Notice: Subject to any disclaimer, the term of this patent is extended or adjusted under 35 U.S.C. 154(b) by 208 days.

(21) Appl. No.: 15/361,302

(22) Filed: Nov. 25, 2016

(65) Prior Publication Data

US 2018/0149671 A1   May 31, 2018

(51) Int. Cl.
| | |
|---|---|
| *B64C 19/00* | (2006.01) |
| *G01P 13/02* | (2006.01) |
| *B64D 43/02* | (2006.01) |
| *B64D 45/04* | (2006.01) |

(52) U.S. Cl.
CPC ............ *G01P 13/025* (2013.01); *B64D 43/02* (2013.01); *B64D 45/04* (2013.01)

(58) Field of Classification Search
None
See application file for complete search history.

(56) References Cited

U.S. PATENT DOCUMENTS

| | | | | |
|---|---|---|---|---|
| 3,604,259 A * | 9/1971 | Heinsohn | ............ | B64D 43/02 73/180 |
| 4,853,861 A * | 8/1989 | Ford | ............ | G01P 5/00 701/14 |
| 7,970,501 B2 * | 6/2011 | Kirkland | ............ | G01C 21/165 340/969 |
| 8,219,264 B1 * | 7/2012 | Blake | ............ | B64D 39/00 701/3 |
| 9,257,050 B2 * | 2/2016 | Fleiger-Holmes | ........ | G01S 1/18 |
| 2002/0121575 A1 * | 9/2002 | Greene | ............ | G05D 1/0676 244/186 |
| 2005/0099433 A1 * | 5/2005 | Berson | ............ | G01D 7/08 345/619 |
| 2005/0165516 A1 * | 7/2005 | Haissig | ............ | G08G 5/0008 701/4 |
| 2012/0265376 A1 * | 10/2012 | Fleiger-Holmes | ... | G08G 5/0021 701/16 |
| 2013/0311013 A1 * | 11/2013 | Rogers | ............ | G01P 5/26 701/14 |
| 2016/0114903 A1 * | 4/2016 | Claudel | ............ | B64D 45/00 701/3 |
| 2018/0156633 A1 * | 6/2018 | Fadden | ............ | B64D 43/02 |

\* cited by examiner

*Primary Examiner* — Sunit Pandya
(74) *Attorney, Agent, or Firm* — Heisler & Associates

(57) ABSTRACT

The angle of attack (AOA) of an airplane is calculated as the difference of the flight-path angle and the pitch angle. The pitch angle is available from an attitude monitoring device (e.g., pitch gyro), but the flight-path angle is not available from the basic instruments common in general aviation. This method determines the flight-path angle mathematically, and in particular, using inputs from indicated airspeed and GPS. The sine (trig function) of the flight-path angle is the value determined by dividing the vertical velocity, provided by onboard GPS, by the velocity along the flight path (e.g., indicated airspeed). The sine value is converted to the value of flight-path angle by referring to a sine lookup table.

5 Claims, 1 Drawing Sheet

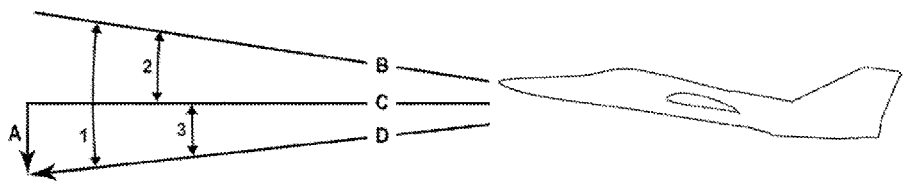

AIRPLANE IN APPROACH TO LANDING

A. Vector represents vertical velocity, available from GPS output
B. Line represents aircraft pitch (direction)
C. Line represents horizontal reference
D. Vector represents flight path (direction) and airspeed (magnitude)

1. Arc represents angle of attack, calculated as difference of pitch angle minus flight-path angle
2. Arc represents pitch angle, available from pitch gyro output
3. Arc represents flight-path angle, calculated from airspeed and GPS data

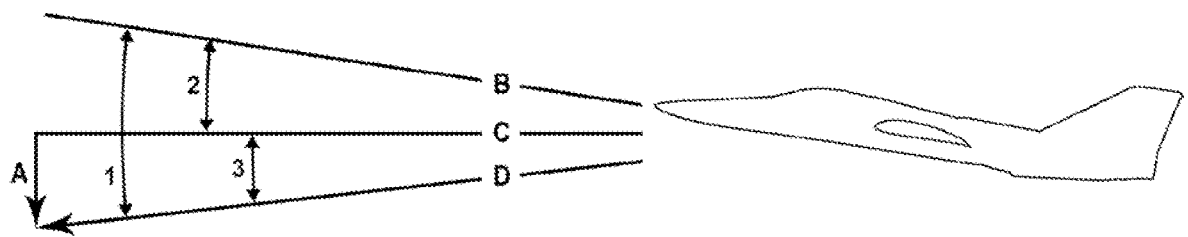

AIRPLANE IN APPROACH TO LANDING

A. Vector represents vertical velocity, available from GPS output
B. Line represents aircraft pitch (direction)
C. Line represents horizontal reference
D. Vector represents flight path (direction) and airspeed (magnitude)

1. Arc represents angle of attack, calculated as difference of pitch angle minus flight-path angle
2. Arc represents pitch angle, available from pitch gyro output
3. Arc represents flight-path angle, calculated from airspeed and GPS data

METHOD FOR DETERMINING AIRPLANE FLIGHT-PATH ANGLE WITH THE USE OF AIRSPEED AND THE GLOBAL POSITIONING SYSTEM (GPS)

CROSS-REFERENCE TO RELATED APPLICATIONS

Not Applicable

STATEMENT REGARDING FEDERALLY SPONSORED RESEARCH OR DEVELOPMENT

Not Applicable

NAMES OF PARTIES TO A JOINT RESEARCH AGREEMENT

Not Applicable

REFERENCE TO SEQUENCE LISTING

Not Applicable

STATEMENT REGARDING PRIOR DISCLOSURES

Not Applicable

BACKGROUND OF THE INVENTION

Technical Field

This invention relates to a method of determining the flight-path angle of an airplane, for the purpose of calculating the airplane's angle of attack (AOA).

Background Art

Angle of attack (AOA) is the angle between the approaching air and the plane of the wing, and it is a critical flight parameter for all airplanes (i.e., fixed-wing aircraft). At excessively high AOA, air will not be able to follow the contour over the wing, and it will separate from the wing surface. This phenomenon is known as "wing stall," and when it occurs, the airplane becomes uncontrollable.

In aerodynamic terms, AOA is the difference of pitch angle (plus wing incidence angle, if any) minus flight-path angle. Pitch angle is the angle between the effective plane of the wing and the horizontal reference. Flight-path angle is the angle between flight-path direction and the horizontal reference.

FIG. 1 illustrates the relationships between AOA (1), pitch angle (2), and flight-path angle (3), giving the example of an airplane in a typical flight attitude for approach to landing.

When both pitch angle and flight-path angle are known values, a basic aerodynamic equation can be used to calculate AOA.

$$\alpha = \theta - \gamma$$

where:
  $\alpha$ is angle of attack (AOA)
  $\theta$ is pitch angle, and
  $\gamma$ is flight-path angle.
[Reference: *Airplane Performance Stability and Control*, Perkins and Hage, Wiley, 1949 (ISBN 047168046X)]

The AOA at which wing stall will occur is a fixed value for a particular airplane design, regardless of the airplane's varying weight. However, instruments in many airplanes provide only indicated airspeed, as information for the pilot to avoid the wing stall angle. This requires the pilot to calculate or estimate the wing stall speed for each significant change in aircraft weight. Direct display of actual AOA information would avoid the problem of erroneous weight estimations, thus improving safety.

The most common method of directly measuring AOA is by a vane, which can align itself with local air flow, located somewhere on the fuselage of the airplane. This local air flow seldom represents the true free air flow throughout the full pitch range of the airplane, due to the effect of the airplane's presence on the air flow.

Some other systems measure AOA using static and/or dynamic air pressure sensors (e.g., static pressure pickups, pitot tubes, or the like), which must be installed on the airplane's exterior surface, usually on the wing. In some cases, installation of those sensors requires a physical retrofit alteration or modification of the airplane.

BRIEF SUMMARY OF THE INVENTION

This invention is a method to determine the flight-path angle of an airplane, using information that is readily available on most airplanes (i.e., indicated airspeed, and vertical velocity derived from GPS data). The resulting flight-path angle value enables further calculation to determine the angle of attack (AOA) of an airplane, using a basic aerodynamic equation.

BRIEF DESCRIPTION OF DRAWINGS

FIG. 1 shows an airplane in typical flight attitude for approach to landing. Lines (B) and (C) represent the pitch attitude and the horizontal reference, respectively. Vectors (A) and (D) represent the vertical velocity, and the flight path (direction and velocity), respectively. Arcs (1), (2), and (3) represent the angle of attack, the pitch angle, and the flight-path angle, respectively.

DETAILED DESCRIPTION OF THE INVENTION

This invention is a method, which involves simple calculation, and particular sources of information (i.e., data input to the calculation), to determine the flight-path angle of an airplane.

The method uses airspeed information (e.g. from the airplane's existing pitot-static tube) and vertical velocity information from the GPS (or similar system, e.g., SBAS, WAAS, DGPS, etc.).

The sine (trig function) of the flight-path angle is calculated as vertical velocity divided by airspeed. Thus, with known values of airspeed and vertical velocity, the value of the flight-path angle is determined by referring to a sine value lookup table.

Angle of attack (AOA) is defined as the difference of pitch angle and flight-path angle, so when both pitch angle and flight-path angle are known values, a basic aerodynamic equation can be used to calculate the AOA.

The pitch angle value is readily available from the attitude monitoring system (e.g., pitch gyro), which is common to almost all airplanes. Pitch angle is usually displayed to the pilot by an attitude indicator or artificial horizon instrument.

The main intended application of this invention is to supply a value of the flight-path angle, for use in calculating the AOA.

Using this invention, the full range of AOA, as well as the critical "do not exceed" point, could be presented to the pilot (e.g., on a separate instrument, or incorporated in existing instruments). This information would enhance situation awareness at all times, and enable the pilot to remain clear of the wing stall angle.

The takeoff and landing phases of airplane flight are the most critical, because the airplane must be flown at relatively high AOA. By using this invention, information could be provided and displayed in the cockpit to improve flight safety during these critical phases.

Key benefits of this invention are:

A method to determine true flight-path angle, free of possible erroneous air flow measurements.

A method to provide accurate input for calculating AOA, based on information already available in most airplanes.

The invention claimed is:

1. A method for monitoring stall of an airplane, the method including the steps of:
    measuring an airspeed value for the airplane with an air speed sensor located upon the airplane;
    detecting and supplying a vertical velocity value for the aircraft from a GPS type system;
    determining an angle of attack for the airplane;
    said determining step including using the vertical velocity value for the airplane from said detecting step and the airspeed value for the airplane from said measuring step;
    displaying the angle of attack on a display for visualization and use of the angle of attack by a pilot;
    wherein said measuring step includes a pitot tube sensing an airspeed value and passing the airspeed value to a processor coupled to the display; and
    wherein said displaying step includes visual depiction of both a do not exceed value for the angle of attack of the airplane and display of the angle of attack for the airplane, adjacent to each other for monitoring and comparison.

2. The method of claim 1 wherein the GPS type system of said detecting step is taken from a group of GPS type systems including SBAS, WAAS and DGPS.

3. The method of claim 1 wherein said displaying step includes the do not exceed value being a wing stall angle for the airplane.

4. A method for monitoring stall of an airplane, the method including the steps of:
    measuring an airspeed value for the airplane with an air speed sensor located upon the airplane;
    detecting and supplying a vertical velocity value for the airplane from a GPS type system;
    determining a flight path angle for the airplane;
    said determining step including using the vertical velocity value for the airplane from said detecting step and the airspeed value for the airplane from said measuring step;
    displaying the flight path angle on a display for visualization and use of the flight path angle by a pilot;
    wherein said measuring step includes a pitot tube sensing an airspeed value and passing the airspeed value to a processor coupled to the display; and
    wherein said displaying step includes visual depiction of both a do not exceed value for the flight path angle of the airplane and display of the flight path angle for the airplane, adjacent to each other for monitoring and comparison.

5. The method of claim 4 wherein the GPS type system of said detecting step is taken from a group of GPS type systems including SBAS, WAAS and DGPS.

\* \* \* \* \*